United States Patent Office 3,282,909
Patented Nov. 1, 1966

3,282,909
METALLO-ORGANIC POLYMERS, THEIR
PREPARATION AND UTILITY
Thomas A. Manuel, Westfield, and Martin Berger, East Brunswick, N.J., assignors to Esso Research and Engineering Company, a corporation of Delaware
No Drawing. Filed May 18, 1965, Ser. No. 456,865
19 Claims. (Cl. 260—94.7)

This application is a continuation-in-part of Serial No. 201,260, filed June 11, 1962, and now abandoned, which, in turn is a continuation-in-part of Serial No. 176,131, filed February 27, 1962, and now abandoned. These applications are incorporated herein by reference in their entirety.

The present invention concerns metallic organic unsaturated polymer compositions, their method of preparation and utility. In particular, the instant invention relates to polyvalent heavy-metal carbonyl complexes such as Group VIII transition metal carbonyl complexes of ethylenically unsaturated hydrocarbon polymers. More particularly, the present discovery concerns oil soluble iron carbonyl complexes of carbon-to-carbon ethylenically unsaturated natural and synthetic hydrocarbon elastomers and rubbery polymers and their vulcanizates. Even more particularly, the present discovery relates to the reaction product of iron carbonyls with ethylenically unsaturated rubbery polymers to obtain oil soluble liquid, semisolid, rubbery, and solid iron carbonyl-containing polymers having enhanced curing rates, their vulcanizates, and novel polyatomic metals, particularly iron-containing and metal alloy-containing polymers possessing magnetic properties.

Hydrocarbon diene monomers have been reacted with iron carbonyls to give monomeric organo-metallic products. These products have limited utility due to the varying stability characteristics of these products. Further, from the structural formulas proposed, these products are incapable of polymerization without destruction of the metal-monomeric complex structure, which structure depends upon the particular conjugate unsaturation of the monomer. For example, butadiene has been reacted with iron pentacarbonyl to give a product of the formula $C_4H_6Fe(CO)_3$, butadiene iron tricarbonyl.

Iron carbonyl has also been employed as a catalyst in catalytic amounts to accelerate polymerization reactions. For example, in U.S. 1,891,203, iron pentacarbonyl has been used in amounts of 10 weight percent or less with oily polybutadiene to accelerate further polymerization. The polymerization is normally carried out in an oxidizing atmosphere or in the presence of oxidizing agents or conditions to produce viscous, gelled or hard polymerization products of limited oil solubility, and incapable of further polymerization or vulcanization reactions.

It has now been discovered that stable high molecular weight unsaturated metal carbonyl and polyatomic metal-containing polymers can be prepared by the reaction between a Group VIII transition metal carbonyl compound of iron, cobalt and nickel and a carbon-to-carbon ethylenically unsaturated hydrocarbon polymer or elastomer. These compositions are prepared by reacting relatively large quantities of metal carbonyl with the polymer in a nonoxidizing atmosphere to obtain oil soluble metal carbonyl polymer complexes. The metal carbonyl-containing elastomer complexes are vulcanizable either alone or with other elastomers at accelerated curing rates to form superior vulcanizates. Also, the metal carbonyl complexed rubbery polymers can be cured with curing agents which fail to cure or give poor cures to the uncomplexed rubbery polymers. Further, these metal complexed polymers exhibit exceptional heat stability and resistant qualities at very high temperatures. Furthermore, heating of these complex polymers alone or in the vulcanization process at elevated temperatures, e.g., over 100° C., or in the presence of excess metal carbonyl yields novel polyatomic metal and polymetallic polyatomic-containing polymers exhibiting ferromagnetic propperties.

The novel metal carbonyl polymer complexes are prepared by contacting the ethylenically unsaturated polymer either in bulk or in solution with the desired metal carbonyl compound in a nonoxidizing atmosphere or under nonoxdizing conditions. The quantity of the metal carbonyl to be employed depends in part upon the degree of unsaturation of the polymer and the desired amount of metal to be complexed with the polymer together with the desired characteristics and the proposed utility of the complexed polymers produced. The maximum quantity of metal carbonyl that can be complexed with the polymer can be determined stoichiometrically by the degree of polymer unsaturation, since each pair of carbon-to-carbon ethylenically unsaturated bonds is capable of complexing one mole of metal. Of course, the reaction can be carried out in situ during the polymerization, copolymerization or the dehydrogenation of a polymer or its monomers. And the reaction can be carried out with less than stoichiometric quantity of the metal carbonyl, where a high metal content is undesirable or not required. Regardless of the quantity of metal carbonyl employed, subsequent vulcanization or curing of the metal carbonyl complexed polymer can be accomplished, whether there exist complex conjugated unsaturated bonds or free unsaturated bonds in the polymer.

The concentration of the metal carbonyl should generally exceed 10 weight percent or catalytic quantities, since these lower amounts are normally ineffective to form sufficient metal complexed polymer for most requirements. Of course, the exact concentration of the metal carbonyl will vary subject to selection, but the preferred amount of metal carbonyl based on the weight of the monomeric polymer unit or copolymer unit in the polymer should be a major amount of 50 weight percent or more, with from 100 to 800, e.g., 150 to 500 weight percent or even higher concentrations often required. The weight percent of metal carbonyl used will depend on the degree of unsaturation of the polymer and the molecular weight of the polymer. These concentration limits may be generally expressed as at least 0.15 or from 0.25 to 2.50, e.g., 0.40 to 1.5, moles of metal carbonyl per mole of ethylenical unsaturation in the polymer. The quantity of the metal carbonyl and metal complexed with the polymer is usually determined by analysis of the infrared spectra of polymer samples or by conventional combustion analysis methods.

The reaction between the metal carbonyl and the polymer to form the complex polymer proceeds over a wide range of temperatures, e.g., 30° to 200° C., but efficient reaction rates require elevated temperatures of over 70° C., with temperatures of 80° to 130° C. generally preferred. The reaction at lower temperatures proceeds without significant degradation in the molecular weight of the polymer. But as the reaction temperature increases, the depolymerization of the polymer increases. The reaction may be carried out at elevated temperatures with the polymer in bulk or in solution, e.g., in hydrocarbon solvents, where degradation of the polymer is of insignificant importance. Where maintenance of the polymer molecular weight is desired, the reaction is preferably carried out in solvent solutions of or containing polar protective solvents.

The time for the completion of the complexing reaction depends upon the reaction temperature selected, the metal carbonyl employed, and other preselected reaction conditions. The time will vary from 1 hour to 72 hours, preferably, 2 to 50 hours, most preferably, 4 to 24 hours. To prevent polymerization and gellation of the polymer during the reaction, a nonoxidizing atmosphere and condition is maintained in the reaction vessel. Gellation is usually prevented by employing a blanket of an inert gas such as nitrogen, helium, carbon monoxide, rare gases, and the like over the polymer after the reaction zone or vessel has been swept clear of air or oxidizing compounds and gases. The reaction proceeds at atmospheric pressures, but pressures of from 0.1 to 10 atmospheres or higher or lower may optionally be used.

In one embodiment of the invention, a protective organic solvent is employed either alone or with a hydrocarbon polymer solvent to protect the polymer from molecular weight degradation at elevated temperatures. In this manner, rapid reaction rates without significant molecular weight degradation can be obtained. Any polar solvent having more polarity than a hydrocarbon such as heptane and other than an acid, acid anhydride or acid chloride may be employed, with those saturated organic solvents containing carbon, hydrogen and oxygen or containing one or more keto, ether or hydroxyl groups being preferred protective solvents. The protective solvent employed should be wholly or partially miscible with the unsaturated polymer or the polymer solution and may, in certain cases, function as both the polymer solvent and the protective solvent such as in the case of ethers like 1,2-dialkoxy alkanes such as 1,2-dimethoxy ethane. The protective solvent when employed in combination with a hydrocarbon solvent normally comprises from 0.5 to 50 volume percent of the solution, e.g., 0.75 to 20 volume percent. Suitable nonlimiting examples of polar solvents include those substituted and unsubstituted, saturated and unsaturated $C_1$ to $C_{30}$ aliphatic, alicyclic, aromatic, heterocyclic and alkyl-aromatic solvents such as cyclohexanol; alkanols like methanol, ethanol, tert butanol; alkyl aromatic alcohols like benzyl alcohol; glycols like propylene glycol, hexylene glycol; ketones like acetone, cyclohexanone; ethers like alkyl and aromatic ethers such as ethyl ether, phenyl ether; diethers such as dioxane and 1,2-dimethoxy ethane; aldehydes like benzaldehyde, acetaldehyde; esters like carboxylic esters such as benzyl acetate, tert butyl acetate and the like, and mixtures and combinations thereof. Dioxane is a particularly preferred solvent since it has the proper combination of basicity and solvent properties.

The process of preparing the polymeric complexes and metal-containing polymers of the invention may be aided, if desired, by the employment of high energy and actinic sources to wholly or partially replace the use of heat. Thus, gamma irradiation or ultraviolet or visible irradiation, e.g., in the range of 1850 to 5500 angstroms may be used alone or in combination to effect the reaction of the metal carbonyl and the polymer or, as subsequently described, the formation of magnetic type polymers. Further, the metal carbonyl, besides being added directly to the polymer as a liquid or solid, can be employed in the gaseous form either as a gas or sublimate vapor. In this situation, any liquid-gas or solid-gas contacting means can be employed such as a sparger beneath the surface of the polymer solution, or column contacting means whereby a stream of metal carbonyl gases is employed in a current or countercurrent direction to the polymer or polymer-containing solution.

A preferred embodiment of the invention comprises adding the unsaturated polymer to a solution comprising a hydrocarbon solvent and polar solvent, and optionally, other conventional additives, sweeping the reaction vessel with nitrogen to remove air, adding the metal carbonyl to the polymer solution, heating the solution to 70° to 200° C., preferably, 100° to 150° C., and subsequently recovering the complexed polymer by precipitating the polymer in a polar precipitation nonsolvent for the polymer, such as an alcohol, ketone and the like; for example, a mixture of an aliphatic alcohol and a strong acid like hydrochloric acid is particularly useful.

The polymers employed are those homo- or copolymers containing some degree of carbon-to-carbon ethylenical unsaturation. The unsaturation may be either in the main chain of the polymers such as present in head-to-tail polymerization methods, and as characterized by natural rubber and synthetic elastomers like butyl rubber, or in the side chains of the polymer such as present in 1,2 polymerization as characterized by vinyl polybutadiene and 3,4 addition in polyisoprene. The ethylenically unsaturated bonds can also be present in both the main and the side polymer chains. The degree of unsaturation of the polymers may vary between 0.5 to 100 mole percent such as between 0.5 and 50 mole percent, e.g., 1 to 30 or 1 to 10 mole percent, for those low unsaturated polymers and between 50 and 99 mole percent, e.g., 50 to 85 or 60 to 80 mole percent, for those highly unsaturated polymers. The unsaturated linkages in the polymer can be conjugated, isolated, or cumulative, or any mixture or combination of these structural arrangements. The polymers prior to the complexing reaction can be partially vulcanized with conventional curing agents or copolymerized with other polymerizable monomers or polymers provided only that at the time of reaction with the metal carbonyl compound there remains some degree of carbon-to-carbon ethylenical unsaturation within the polymer chain or molecule. The polymers within the scope of the instant discovery may be broadly characterized as those ethylenically unsaturated polymers having an average molecular weight of from 1,000 to 3,000,000, preferably 1,000 to 250,000, or higher or lower, and having Wijs iodine numbers of from 1 to 600, e.g., 1 to 50, for the low unsaturation polymers and over 100, e.g., 200 to 400, for the highly unsaturated polymers.

Particularly suitable polymers and elastomers include those ethylenically unsaturated hydrocarbon rubbery polymers capable of cross-linking or vulcanization and being elastic in character. Nonlimiting examples of unsaturated polymers suitable for the purposes of the invention include:

(1) Copolymers of a diene and a vinyl aromatic generally known as GR-S or SBR type rubbers commonly made by copolymerizing from 30 to 80 weight percent of a $C_4$ to $C_8$ conjugated diene such as butadiene, isoprene, or a cyclic diene such as cyclopentadiene or cyclohexadiene and a hydrocarbon substituted, e.g., an alkyl substituted, diene such as dimethyl butadiene with from 70 to 20 weight percent styrene, dimethyl styrene and alkyl substituted vinyl aromatics of a vinyl aromatic such as divinyl benzene and the like, the preferred copolymer being that reaction product of about 70 to 80 weight percent of butadiene with about 20 to 30 weight percent of styrene.

(2) Polydienes such as those hydrocarbon polymers prepared by the homopolymerization of conjugated dienes like butadiene, isoprene, cyclic dienes like cyclopentadiene, and particularly $C_1$ to $C_3$ alkyl substituted dienes.

(3) Copolymers prepared by copolymerizing major amounts of from 50 to 98 weight percent, e.g., 60 to 80 weight percent, of a $C_4$ to $C_8$ cyclic or straight chain diene such as butadiene, isoprene, cyclopentadiene, hexadiene and the like with minor amounts of from 2 to 40 weight percent of a $C_2$ to $C_6$ monoolefin like ethylene, propylene, diisobutylene, isobutylene, pentene and the like.

(4) Natural rubber and natural rubber latexes such as those natural elastomeric products derived from the latex of the Hevea and Ficus species. These products are characterized by a high level of unsaturation, rubbery-like characteristics and commonly have Wijs iodine numbers of above 200, such as from 200 to 400 or even higher.

These copolymers and homopolymers described above may be copolymerized further with minor amounts, such as from 1 to 30 weight percent, of organic polymerizable monomers or other polymerizable polymers containing one or more vinyl, vinylene, or vinylidene groups such as vinyl aromatics like styrene, divinyl benzene; vinyl cyanides like acrylonitrile, ethacrylonitrile; vinyl esters like the vinyl esters of short chain fatty acids, e.g., vinyl acetate, long chain fatty alcohol esters of acrylic acid and $C_1$ to $C_3$ alkyl substituted acrylic acid; halogenated vinyl compounds like vinylidene chloride, vinyl chloride, chloroprene, ethylene dichloride and the like.

The polymer types described above are commonly referred to as high unsaturation polymers having at least 30 mole percent of unsaturation such as from 50 to 99 mole percent unsaturation.

Unsaturated polymers and particularly those polymers described above can be reacted with the desired metal carbonyl either in bulk or in solution. In order to assure a rapid reaction rate and intimate contact of the metal carbonyl with the polymer by mixing or agitation during the course of the reaction, it is preferred that the polymer be dissolved in an inert organic solvent. Some polymers having molecular weights of below 10,000 have viscosities low enough to permit the bulk polymer to be used without solvent. Polymers that are fluid can be used without the necessity of solvent, although solvent could always be used if desired. Those polymers of higher molecular weight and especially those above 50,000 usually require solvation to obtain suitable handling and mixing characteristics. These polymers may then be used in solvents at varying proportions, while very high molecular weight polymers such as above 200,000 are commonly employed in solutions of not more than 20 weight or 10 weight percent such as from 1 to 6 weight percent.

Suitable solvents to be employed in effecting solvation include, but are not limited to, aliphatic and aromatic hydrocarbons like benzene, toluene, xylene, hexane, heptane, petroleum naphtha, cyclohexane, and the like; ethers such as tetrahydrofuran, 1,2-dimethoxyethane, bis(2-methoxyethyl)ether and the like; ketones like acetone, acetylacetone, methylethyl ketone, methylisobutyl ketone, cyclohexanone and the like; carbon disulfide and mixtures thereof.

This invention is applicable to any unsaturated polymers or elastomers regardless of the method of polymerization employed to obtain the original starting polymer. Thus, the instant process can be profitably employed with those unsaturated polymers normally prepared by the use of heavy metal-organo metal catalysts such as aluminum alkyl-titanium halide systems, for example, the aluminum-triethyl-titanium tetrahalide system referred to as Ziegler catalysts or with metal alkyl-cobalt salt complex systems, as well as with alkali metal catalysts like alkyl-lithium or lithium metal catalysts or with a Friedel-Crafts catalyst like aluminum chloride, boron trifluoride and the like, as well as with those polymers commonly prepared by organic or inorganic free radical initiators or anionic or cationic emulsion polymerization techniques or any other methods. Many such processes are described in Preparative Methods of Polymer Chemistry, by W. Sorenson and T. W. Campbell, Interscience Publishers, N.Y. (1961), while many of the polymers such as butyl rubber and GR-S are described in greater detail in Synthetic Rubber by G. S. Whitby, J. Wiley & Sons, Inc., N.Y. (1954).

The metal carbonyls suitable for the purposes of this invention include metal carbonyls of iron, cobalt and nickel and their substituted derivatives, and combinations and mixtures thereof. Of particular preference are those iron carbonyl compounds due to their availability, relatively low cost, stability and low toxicity characteristics. The metal carbonyl employed can be in monomeric or polymeric form, substituted or unsubstituted, with those stable unsubstituted carbonyls being of particular significance. The metal carbonyls can contact the unsaturated polymer in any desired physical form such as a liquid, as with $Fe(CO)_5$; as a gas or sublimate vapor, as with $Fe(CO)_5$; or as a solid, as with $Fe_3(CO)_{12}$ and $Fe_2(CO)_9$; or any combinations thereof. Many carbonyls sublimate, and, therefore, these carbonyls may initially contact the polymer as a solid and subsequently, depending upon the reaction conditions, sublimate to a vapor during the course of the reaction.

Nonlimiting examples of suitable metal carbonyl compounds include those monomeric, dimeric, trimeric and tetrameric carbonyls having from 4 to 12 carbonyl groups, e.g., 4 to 8 carbonyl groups, wherein the carbonyl groups are bonded directly to the metal such as those unsubstituted metal carbonyls like iron pentacarbonyl, di-iron nonacarbonyl, tri-iron dodecacarbonyl, dicobalt octacarbonyl, tetracobalt dodecacarbonyl, nickel tetracarbonyl and the like.

A further class of suitable carbonyl compounds includes the neutral and anionic metal carbonyl hydrides wherein one, two, three, four or more hydrogens, as well as carbon monoxide, are bonded directly to the metal, or a combination of hydrocarbons, carbon monoxide and other ligand substituents are bonded directly to the metal as well as the hydrogen. Suitable transition metal carbonyls include the neutral cobalt tetracarbonyl monohydride $HCo(CO)_4$, the neutral iron tetracarbonyl dihydride $H_2Fe(CO)_4$, the anionic bis iron octacarbonyl monohydride $[HFe_2(CO)_8]^-$, the anionic tris iron undecacarbonyl monohydride $[HFe_3(CO)_{11}]^-$, the anionic iron tetracarbonyl monohydride and the like. Also suitable for the purposes of this invention are the neutral salts of the anionic metal carbonyl hydrides. An example of a suitable neutral salt formed by the reaction of an alkyl amine with the anionic metal hydride carbonyl would be $[C_2H_5NH]^+[HFe_3(CO)_{11}]^-$.

The basic polymeric complex unit in the polymer can be represented by the general formula

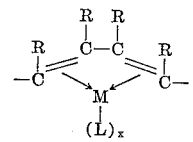

wherein M is a metal selected from the group consisting of iron, cobalt and nickel; R comprises a substituent group like hydrogen and hydrocarbons, particularly $C_1$ to $C_3$ alkyl groups and combinations thereof; L is an electron donating ligand group bonded directly to the metal atom particularly carbonyls, halides, hydrogen, hydrocarbons; halides and hydrocarbons can be present by subsequent substitution; $x$ represents the number of ligand groups and, depending upon the metal and the number of electrons shared by the ligand groups with the metal, can be a number from 1 to 4, such as 1, 2, 3 or 4, usually 3.

The unsatisfied valence bonds of the polymeric complex unit $—R_4C_4ML_x—$ are satisfied by one or more of either other polymeric complex units as described, or by other ethylenically unsaturated or saturated hydrocarbon groups within the main or side chain, such as

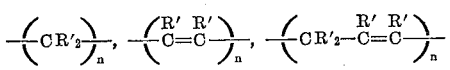

and the like wherein R' is a radical such as hydrogen and hydrocarbon radicals such as alkyl, aryl, alkyaryl, olefinic, cyclodiene radicals and $n$ is a number from 1 to 10, e.g., 2 to 8. Suitable examples include methylene, vinylene and vinylidene radicals. The complex unit can be interspersed within the other groups of the polymer in any combination such as in isolated, cumulative or conjugate positions. Of course, the ends of the polymer main or side chain and also the complex unit where this unit is on the end of the chain are terminated with the usual terminal end groups such as $CR'_3—$, $CR'_2=CR'—$ and hydrogen. The exact amount and nature of the complex unit distribution within the polymers depends on the type of polymer, the degree of ethylenical unsaturation before and after the reaction, and other factors within the selection or control of the formulator skilled in the art.

In the reaction between the polymer and the metal carbonyl compound, the isolated ethylenically unsaturated bonds are transposed to conjugate positions. For example, in the reaction between polybutadiene and iron carbonyl, the pair of remaining ethylenical bonds in two polymerized monomers is conjugated with the resulting structural formula of

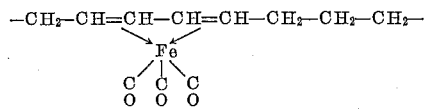

with the unsatisfied valences satisfied as before by the remaining portion of the polybutadiene structure such as by $C_4H_6$ groups or multiples thereof or by terminal groups such as $C_4H_7$ groups. The polybutadiene complex unit may also be generally represented by

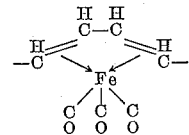

The nature and advantages of the instant invention may be more fully illustrated by the following examples.

EXAMPLE 1

A solution of 1.75 g. of cis-1,4 polybutadiene in 160 ml. of p-xylene was mixed with 18 ml. of 1,2-dimethoxyethane and 4.0 g. of $Fe_3(CO)_{12}$. The mixture was heated to reflux (160° C.) for one hour under nitrogen. Dropwise addition of the cooled mixture to a stirred mixture of 600 ml. of 95% ethanol, 200 ml. of acetone, and 30 ml. of concentrated HCl gave a yellow, rubbery precipitate. Infrared analysis of the precipitate after washing in acetone and drying in vacuo showed the presence of 34% of $C_8H_{12}Fe(CO)_3$ units. Of the units remaining uncomplexed, there were 84% of cis-1,4 units, 5% of 1,2 units, and 11% of trans-1,4 units. Combustion analysis showed the presence of 38% of $C_8H_{12}Fe(CO)_3$ units. This corresponds to the presence of 21 percent by weight of $[Fe(CO)_3]$ units in the total polymer.

EXAMPLE 2

The general procedure of Example 1 was employed with variations in the nature of the starting polymer, the principal solvent and the protecting solvent, with variations in the polymer and carbonyl concentration, and with variations in the reaction time or reflux time and temperature as summarized in Table I. The complexed polymer products obtained were yellow to cream-colored, rubbery precipitates.

*Table I*

| Starting Polymer (*) | Principal Solvent | Protective Solvent | Grams Polymer / 100 ml. Solvent | Metal Carbonyl | Wt. Metal Carbonyl To Wt. Polymer | Time[1] Reacted | Wt. percent $[Fe(CO)_3]$ In Product $\frac{Wt. [Fe(CO)_3]}{Total\ Wt.\ product} \times 100$ |
|---|---|---|---|---|---|---|---|
| (1) "Diene,"[2] Polybutadiene: 51% trans-1,4; 38% cis-1,4; 11% 1,2. | Benzene | 10% 1,2-dimethoxyethane. | 1 | $Fe_3(CO)_{12}$ | 2.3 | 2½ hr | 18. |
| (2) Cis-4[3] Polybutadiene: 92% cis-1,4; 4% trans-1,4; 4% 1,2. | do | 8% benzaldehyde | 1 | $Fe_3(CO)_{12}$ | 2.3 | 2¼ hr | 22. |
| (3) Cis-4 Polybutadiene | Ethylcyclohexane. | 10% bis(2-methoxyethyl) ether. | 1 | $Fe(CO)_5$ | 8.6 | 2 hr | 19. |
| (4) Cis-4 Polybutadiene | p-Xylene | 10% 1,2-dimethoxyethane. | 1 | $Fe_3(CO)_{12}$ | 2.3 | 1 hr | 21. |
| (5) Cis-4 Polybutadiene | Benzene | do | 1 | $Fe_3(CO)_{12}$ | 1.7 | 263 hr at 75–85° F. | 13. |
| (6) Cis-4 Polybutadiene | do | 8% ethanol | 1 | $Fe_3(CO)_{12}$ | 2.3 | 2½ hr | 26. |
| (7) Cis-4 Polybutadiene | do | 11% ethyl iodide | 1 | $Fe_3(CO)_{12}$ | 2.3 | 3 hr | 14. |
| (8) Trans-4[3] Polybutadiene: 92% trans-1,4; 4% cis-1,4; 4% 1,2. | do | 10% ethanol | 1 | $Fe_3(CO)_{12}$ | 2.3 | 2 hr | 23. |
| (9) Cis-4 Polybutadiene | do | 20% ethanol | 1 | $Fe_3(CO)_{12}$ | 4.3 | 21 hr | 40. |
| (10) Cis-4 Polybutadiene | do | None | 1 | $Fe_3(CO)_{12}$ | 2.1 | 22 hr | 17. |
| (11) Cis-4 Polybutadiene | do | 20% acetone | 1 | $Fe_3(CO)_{12}$ | 2.1 | 22 hr | 22. |
| (12) Natural Rubber | do | 6% 1,2-dimethoxyethane. | 0.6 | $Fe_3(CO)_{12}$ | 4.0 | 2 hr | 16. |
| (13) Natural Rubber | Xylene | 9% bis(2-methoxyethyl)ether. | 1 | $Fe(CO)_5$ | 8.3 | 5 hr | 15. |
| (14) 25/75 Styrene-Butadiene Copolymer, GR–S Rubber. | Benzene | None | 1 | $Fe_3(CO)_{12}$ | 2.5 | 20 hr | 10% of butadiene fraction. |
| (15) Polybutadiene: 81% 1,2 units; 8% cis-1,4; 11% trans-1,4. | do | do | 0.75 | $Fe_3(CO)_{12}$ | 3.0 | 21 hr | 24. |
| (16) Cis-4 Polybutadiene | Xylene | 11% bis(2-methoxyethyl)ether. | 1 | $Fe(CO)_5$ | 4.2 | 1½ hr | 22. |
| (17) Cis-4 Polybutadiene | n-Heptane | 5% acetone | 1 | $Fe_3(CO)_{12}$ | 2.3 | 3 hr | |
| (18) Cis-4 Polybutadiene | Xylene | None | 3 | $Fe(CO)_5$ | 6.1 | 48 hr. in 135° bath. | 42. |
| (19) Cis-4 Polybutadiene | do | 1% dioxane | 3 | $Fe(CO)_5$ | 4.8 | 48 hr. in 135° bath. | 37. |
| (20) Cis-4 Polybutadiene | do | 2.5% dioxane | 3 | $Fe(CO)_5$ | 6.1 | 48 hr. in 135° bath. | 46. |
| (21) Buton 150[4] | do | do | 3 | $Fe(CO)_5$ | 6.1 | 24 hr. in 135° bath. | 17. |

[1] In refluxing solvent, except as otherwise indicated.
[2] Firestone Rubber Co.
[3] Phillips Petroleum Co.
[4] Polybutadiene of mol. wt. 2300: Enjay Chem. Co.

In Table I above, (\*)=the viscosity average molecular weights of the starting polymers were approximately as follows: cis-4 polybutadiene, 246,000; trans-4 polybutadiene, 120,000; natural rubber, 1,000,000; and GR–S 500,000. The polybutadienes and natural rubber had about 1 mole of unsaturation per mole of monomer, while the GR–S was about 75 mole percent unsaturated.

The complexed elastomers of Examples 1 and 2 may be compounded or vulcanized in the presence of or in combination with other natural and synthetic elastomers, resins and plastics, like chlorinated and brominated butyl rubber, polyisoprene, polybutadiene, ethylene-propylene rubber, isoprene-vinyl pyridine copolymers, chloroprene rubber (Neoprene), nitrile rubbers (butadiene-nitrile rubbers), butadiene-styrene rubber, acrylates, polysulfides, chlorosulfonated polyethylene, polyurethanes, silicone rubbers and the like.

The complexed elastomeric products of Examples 1 and 2 have the further property of being self-curable or vulcanizable with curing agents either alone or in combination with vulcanization accelerators. Suitable nonlimiting examples of preferred curing agents include those nonsulfur and nonsulfur-containing curing agents, for example, polyvalent metal oxides like zinc oxide and metal oxides in combination with amines and quinones such as alkaline earth or Group IV oxides with polyamines and with quinones; amines like primary aliphatic amines and polyamines, for example, alkyl amines like n-decyl amines and alkylene diamines like hexamethylene diamine; oximes like p-quinone dioxime and p-quinone dioxime dibenzoate; quinones like benzoquinone; organic nitroso-containing compounds such as aromatic dinitroso curing agents like p-dinitroso benzene; organic and inorganic peroxides like α,α-dicumyl peroxide (commonly vended under the trade name "Di-Cup"), benzoyl peroxide, lauroyl peroxide, 2,5 - dimethyl - 2,5-di(t-butyl-peroxy) hexane, 1-menthane peroxide, methylethyl ketone peroxide, etc.; and phenol-aldehyde resins and combinations and mixtures thereof. The phenol-aldehyde resins such as polymethylol phenol resins generally prepared by reacting a para or meta hydrocarbon, e.g., alkyl substituted phenol with an excess of an aldehyde, e.g., formaldehyde or resorcinol, in the presence of a strong alkaline catalyst, e.g., an alkali metal hydroxide like sodium hydroxide to give heat reactive monomers and resol type resins such as 2,6-dimethyl-4-octyl phenol, 2,6-dimethylol-4-phenyl phenol and the like, and halogenated, e.g., chlorinated and brominated, polymethylol phenol resins. The unhalogenated resins are known under the trade name of Amberol.

The preferred curing agents and accelerators are those compounds which will not react preferentially with the metal of the complexed polymer. The use of sulfur or sulfur-containing curing agents and accelerators either alone or in combination with other curing agents is not preferred since, for example, the sulfur tends to give poor cures with an iron-containing complexed polybutadiene. However, sulfur, thio-organic compounds, thioamides, thiocarbamates like metal dialkyl thiocarbamates may be employed in minor quantities in combination with preferential curing agents or even alone in those applications where the type of cure is not of the highest importance.

The complexed elastomers and derivatives of this invention may be compounded particularly prior to curing with from 1 to 300, e.g., 50 to 100, parts per hundred parts of elastomer with various fillers, such as organic and inorganic inert fillers like clays, hydrated silica, silica, talc, diatomaceous earths, kaolin, lithopone, metal oxides like magnesium oxide, titanium dioxide, oxy and nonoxy carbon black, as well as with waxes, tars, thermoplastics, resins, synthetic organic esters, plasticizers, hydrocarbon oil plasticizers and oil extenders, polyolefins like polyethylene and polypropylene, glycols, natural and synthetic fibers like animal fibers, vegetable fibers (cotton), regenerated fibers (cellulose paper), synthetic fibers (polyamides, cellulose derivatives, polyesters, etc.), inorganic fibers (asbestos and glass fibers), coloring pigments, antioxidants, and the like.

The metal complexed polymers or the heat treated polyatomic polymers prepared in accordance with the present invention may be compounded with any of the well-known materials conventionally added to natural and synthetic rubbers, e.g., butyl rubber. For instance, it may contain any one or more of the following materials in the amounts shown:

| Ingredients: | Parts by weight |
|---|---|
| Complexed or polyatomic polymers | 100 |
| Other rubbers such as SBR and natural rubber | 1–100 |
| Fillers such as carbon black and siliceous substances | 25–75 |
| Fatty acids such as stearic acid | 1–10 |
| Metal oxides such as zinc oxide | 0.5–20 |
| Pigments such as titanium dioxide | 1–20 |
| Oils such as hydrocarbon oils | 1–30 |
| Curing agents such as resins, amines, etc. | 1–20 |
| Accelerators | 0.5–10 |
| Scorch retarders | 0.5–10 |
| Antioxidants such as phenyl naphthylamine | 0.1–5 |

The complexed elastomers may be vulcanized at temperatures of from about 150° F. or higher, advantageously at about 200° F. to about 450° F., and preferably at about 250° F. to 400° F. for from about several seconds to 5 days or more. Commonly, vulcanization or covulcanization is from 10 minutes to 24 hours at about 200° F. to 1 minute to 2 hours at 400° F. The vulcanizates find utility as belting, hose, laminated rubbery articles, coatings, rubbery fluid holding bags, in tires either alone or in combinatioin with other elastomers for carcass, sidewalls, inner liners, treads, and the like.

The complexed elastomers have many unique properties. These elastomers cure at enhanced rates with curing agents to form vulcanizates of excellent physical and dynamic characteristics. Further, complexed elastomers give excellent cures at good curing rates with curing agents that are ineffective or give poor cures to the uncomplexed elastomer. Another advantage of the novel complexed elastomer is the ability of the complexed, highly unsaturated elastomers such as the iron carbonyl polybutadiene to be self-curing at elevated temperatures. Thus, self-curing can be effected by temperatures of from 100° to 300° C., e.g., 150° to 250° C., for 4 hours to 1 minute, e.g., 2 hours to 10 minutes.

EXAMPLE 3

Samples of the iron carbonyl complexed polybutadiene of Run #9 of Example 2 and the starting polymer of cis-polybutadiene were compounded separately on a rubber mill into the following compositions:

*Table II*

|  | #1 | #2 | #3 | #4 | #5 | #6 |
|---|---|---|---|---|---|---|
| Cis-1,4 Polybutadiene | 100 | ---- | 100 | ---- | 100 | ---- |
| Complexed Polybutadiene | ---- | 100 | ---- | 100 | ---- | 100 |
| Hexamethylene Diamine | 2½ | 2½ | ---- | ---- | 1½ | 1½ |
| p-Benzoquinone | ---- | ---- | 2 | 2 | ---- | ---- |
| Lead Dioxide | ---- | ---- | 5 | 5 | ---- | ---- |
| MgO | 1 | 1 | ---- | ---- | ---- | ---- |
| HAF Black | ---- | ---- | ---- | ---- | 50 | 50 |

The resulting compounded blends of Table II were then cured under the conditions shown in Table III and the following physical inspections noted:

*Table III*

| Compound | Cure, min./°F. | Tensile Strength (p.s.i.) | Elongation (percent) | Modulus at 300% Elongation (p.s.i.) |
|---|---|---|---|---|
| #1 | 30'/310 | No cure | | |
| #2 | 30'/310 | 941 | 800 | 147 |
| #2 | 60'/310 | 412 | 550 | 147 |
| #3 | 60'/310 | Poor Cure | | |
| #4 | 60'/310 | 575 | 260 | |
| #4 | 30'/310 | 375 | 210 | |
| #4 | 30'/280 | 353 | 320 | 325 |
| #5 | 60'/300 | No Cure | | |
| #6 | 10'/280 | 1,175 | 120 | |
| #6 | 30'/280 | 2,023 | 170 | |
| #6 | 60'/300 | 2,521 | 120 | |

The above data show that vulcanizates having excellent physical properties are obtained by vulcanizing the complexed iron carbonyl polybutadiene. In particular, the above data demonstrate that the complexed elastomers have enhanced curing rates and better vulcanizate physical properties than the complexed nonmetal-containing elastomer. More particularly, these data indicate that complexed elastomers can be cured with curing agents that are wholly ineffective or only partially effective with the uncomplexed elastomer. The term "no cure" has been used to designate that condition wherein the compositions maintained substantially the same consistency as the material prior to being subject to vulcanizing conditions, that the tensile strength of the composition material was less than 100 p.s.i., that the modulus value was less than 100 p.s.i., and that the material failed to behave as a vulcanized elastomer. The term "poor cure" designates that condition wherein tensile strength is less than 200 p.s.i. and there is very little evidence of elastic retraction.

EXAMPLE 4

The metal complexed polymers containing iron, cobalt or nickel or combinations thereof with these and other polyvalent heavy metals either in bulk or in solution can be heated at elevated temperatures to obtain polymers exhibiting magnetic characteristics. Heating is accomplished at temperatures above 100° C., for example, 150° C. to 1000° C., such as 200° to 500° C. for periods of time sufficient to obtain the desired magnetic properties, for example, from about 10 minutes at the higher temperatures to 12 or more hours at the lower temperatures, such as from 1 to 5 hours at 250° to 500° C. After heating, the metal complexed polymers containing metals that normally exhibit magnetic characteristics in either the metal oxide or polyatomic elemental metal or alloy form are magnetic without the separation of the metal component, that is, the heated polymer demonstrates induced magnetism when placed in a magnetic field. As known, a physical mixture of a magnetic material with a polymer when placed in a magnetic field separates the metal from the polymer. Heating of the metal complexed polymers effects the formation of small, finely divided metal or metal oxide or both metal and metal oxide crystals throughout the polymer chain. Prior to heating, the metal is in a zero valence state and is complexed with the conjugate unsaturated bonds of the polymer. These crystals are apparently intertwined among the polymer chain and not readily separated by ordinary magnetic separation methods. These crystals commonly have an average cluster or particle size of about 10 to 150 angstroms. However, the growth and ultimate size of these crystals, which size affects their magnetic properties to some degree, are dependent in part upon the rate of heating, with the quantity of induced magnetism generally increasing with time and temperature to an optimum point.

Heat treatment of the metal complexed polymer can be accomplished alone with solid or rubbery complexed elastomers or in a solvent, e.g., hydrocarbon solution of the polymer. Heat treatment of the rubbery metal complexed elastomer either alone or in combination with other recited elastomers produces a dark-colored solid or plastic capable of being ground into a dispersible, finely divided powder exhibiting magnetic properties. Further, the metal complexed polymer can be dissolved in a solvent or dispersed in a nonsolvent and heat treated at 100° to 200° C., e.g., 110° to 150° C., to provide liquid solutions and slurries exhibiting magnetic properties. Where a liquid solution or slurry is desired, it is preferable that the heat treatment be carried out in the presence of additional metal carbonyl of either the same or a different metal carbonyl used to prepare the complexed polymer. The addition of from 100 to 1000 weight percent, e.g., 100 to 300 weight percent, excess metal carbonyl in the solvent or slurry promotes the efficient formation of magnetic properties in the polymer.

The heating of the metal complexed polymer can be employed with other than ferromagnetic complexed metals where it is desired to produce polymers containing fine metal, metal alloy, and metal oxide crystals and combinations thereof for use as catalysts, activators, adsorbents, or other purposes. The formation of a polymer containing all or a portion of the complexed metal in the form of polyatomic elemental metal crystals is accomplished by heating the complexed polymer under nonoxidizing conditions, for example, in a nonoxidizing atmosphere employing nonoxidizing gases such as $H_2$, nitrogen, the rare gases such as He, Ar and Ne or in vacuo.

As previously discussed, the metal complexed elastomers are self-curing, especially those high unsaturated metal complexed elastomers. Magnetic polymers can be obtained under nonoxidizing conditions or during or in conjunction with vulcanization, either self-vulcanization or conventional vulcanization with curing agents. Vulcanization in a vulcanization press or under conditions of elevated pressure, for example, 1000 to 80,000 p.s.i.g., such as 5,000 to 60,000 p.s.i.g., at 200° to 600° F. for 1 to 60 minutes and limited air contact or oxidizing conditions, promotes the formation of fine metal oxide crystals rather than polyatomic elemental metal crystals. Where an iron tricarbonyl polybutadiene is heated at elevated temperatures in the air under atmospheric pressure conditions, self-curing occurs with the formation of primarily nonmagnetic $Fe_2O_3$ crystals. Vulcanization at elevated temperatures of the same material in a vulcanization press under limited air contact and pressure conditions produces fine crystals of magnetite $Fe_3O_4$ and creates a vulcanizate having magnetic properties. The process selected depends upon the result desired, that is, a nonmagnetic metal oxide-containing polymer or a magnetic metal oxide-containing polymer.

Magnetic and nonmagnetic metals, metal oxides, and their alloys and combinations thereof can be obtained by heat treating the complexed polymers in the presence of other finely divided metals in elemental form or with metal-containing compounds to form alloys and mixtures of metals and metal oxides in the polymer exhibiting desirable properties. Compounding a metal oxide, a metal, a metal complexed polymer or a metal-containing compound on a rubber mill, together with one or more metal complexed elastomers, and then heating the mixture at elevated temperatures permits the metals to form mixtures of metal oxides and metal alloys. Suitable nonlimiting examples of other metal compounds include: metal carbonyls like molybdenum carbonyl; inorganic metal salts of strong and weak acids like cuprous chloride, stannous chloride, and the like; hydrocarbon metal complexes such as metal dicyclopentadiene compounds like dicyclopentadienyl iron, and their alkyl and other derivatives like methyl cyclopentadienyl manganese tricarbonyl; metal oxides and hydroxides such as cuprous oxide, and stannous oxide; and organic metal salts such as metal salts of fatty acids like nickel stearate, cobalt oleate, etc.

The metals or metal-containing compounds can be finely divided, transition metals and transition metal-containing, organic and inorganic compounds of metals such as Group VI metals like chromium, molybdenum, and tungsten; Group IV metals like titanium, zirconium; Group V metals like vanadium, arsenic niobium, antimony and tantalum; and the Group VIII transition metals of iron, cobalt, nickel, ruthenium, palladium, rhodium, osmium, iridium, and platinum and combinations thereof to produce magnetic and nonmagnetic metal and metal alloy combinations. Germanium, tin, lead and silicon metals and compounds can also be used.

Although the conversion of the metal complexed polymer into a magnetic metal-containing polymer has been described with reference to simultaneous self-curing, it is also possible and preferred that the complexed elastomer be cured to the desired vulcanizate with curing agents and then be further heat treated with or without added heavy polyvalent metal-containing compounds to obtain the desired magnetic properties. Also, the highly metal-complexed polymers can be heat treated to produce a polyatomic metal-containing polymer having magnetic properties. Although the use of elevated temperatures is the most preferred and economical method to form the magnetic and nonmagnetic metal-containing polymers, these polymers may also be obtained by other high energy sources.

The complexed polymers or elastomers to be heat treated can be in solid, rubber-like, or in liquid form. Where a solid or semisolid complexed polymer or elastomer is heat treated, the resulting material generally is a dark or black-colored material. This material can be used as is or be ball milled, attrited, ground or reduced in size by conventional grinding, shredding or particle size reduction methods such as by steel calender rolls set at a clearance of less than 50 mils, ball mills contain porcelain or steel balls and the like, either alone or with other elastomers and fillers. The particles obtained have utility as rubber reinforcing agents, catalysts, in making low density magnetic materials, for magnetic tape coating compositions, magnetically and electrically responsive fluids and solids, magnetic printing inks, paint compositions, etc. Additionally, the metal complexed polymer can be dissolved or slurried in suitable solvents as previously described and subjected to heat treatment to obtain a dark-colored magnetic solution or slurry of the metal-containing magnetic polymer. This magnetic solution will flow freely in the absence of a magnetic field, but will become gelled or a rigid or a semisolid upon the application of a magnetic field, such as that induced by a surrounding coil in which an electric current flows. Upon removal of the magnetic field, the liquid will again be free flowing.

Another embodiment of the invention concerns the heat treatment or vulcanization of the complexed polymer in the presence of a strong magnetic field, such as from 100 to 100,000 gauss, e.g., 500 to 10,000 gauss. In this manner, the magnetic field tends to orient the polyatomic metal crystals formed by the heat treatment in the particular field direction, thereby enhancing the magnetic properties of the resulting polymer.

To demonstrate the induced magnetism of a metal complexed elastomer, a 2 gram sample of the iron complexed polybutadiene of Run #9 of Example 2 was heat treated at the temperatures and times indicated in a press at a pressure of 50,000 to 60,000 p.s.i. to effect self-curing and to produce a magnetite-containing polybutadiene having an average crystal size of about 50 angstroms. The heat treated iron oxide-containing polybutadiene sample was then tested for induced magnetism in a magnetic field of 2200 oersteds. The measurement of the magnetic induction of the polyatomic iron portion of the polymer was accomplished by a Sucksmith balance as described in Review of Science Instruments, 23, 618 (1952). This instrument and method measures the magnetic susceptibility of the sample by means of a strain gauge near the edge of a magnetic field, which records the force of deflection of the sample by the induced magnetism of the field.

*Table III*

| Heat treatment min. @ °F.: | Measurement of magnetic induction in gausses |
|---|---|
| 10′ @ 450 | 1410 |
| 20′ @ 450 | 2620 |
| 30′ @ 450 | 3420 |
| 40′ @ 450 | 3920 |
| 30′ @ 450 | 3420 |
| 60′ @ 450 | 4250 |
| 3′ @ 520 | 1600 |
| 5′ @ 520 | 3300 |
| 10′ @ 520 | 3300 |
| 15′ @ 520 | 1600 |
| 30′ @ 520 | 2420 |

The above data demonstrate the magnetic susceptibility of a heat treated iron tricarbonyl complexed polybutadiene. The magnetic properties of the metal complexed elastomer generally increased with the time of the heat treatment, in this case reaching a maximum at 40 to 60 minutes at 450° F. and a maximum at 5 to 10 minutes at 520° F. Heat treatment of from 200° to 600° F., e.g., 250° to 550° F. or higher, for from 1 minute to 120 minutes, e.g., 3 to 60 minutes or higher, can be employed to produce polymers having magnetic characteristics. The preferred method is to employ lower temperatures of 350° to 450° F. for longer periods of time, 10 to 120 minutes, to promote the slow formation of the finely divided crystals, with higher temperatures and shorter periods of time yielding lower values of magnetic induction. The polybutadiene after heat treatment was a black plastic material of intermediate strength, i.e., 1000 p.s.i. tensile strength.

EXAMPLE 5

A further important characteristic of the novel chelated polymers of this invention concerns the superior heat stability and heat resistant properties of the metal complexed polymers in comparison to the uncomplexed polymers from which they are derived. The complexed polymers and the heat treated metal-containing polymers thus have utility in those applications and under those conditions of elevated temperature where heat stability is an important or determining factor. Further, these polymers can be employed where maintenance of a particular geometric form at elevated temperatures, for example, above 500° or 1000° C., is of importance. One method of employment could be as a vulcanizate or polymeric coating of a magnetic or nonmagnetic complexed polymer as an ablative material for rocket nose cones and other devices developing higher surface temperatures through friction or direct heat. Additionally, heat treatment can be employed to obtain porous polymers of preformed or preselected geometry. For example, the pyrolysis of the metal complexed polymers to polyatomic metal-containing magnetic polymers to porous heat stable pyrolyzed polymers of preselected geometry is accomplished by heating the polymer to elevated temperatures of over 425° C., between 500° and 1000° C., or over 500° C.

To demonstrate the enhancement in heat stability achieved by the polymers of this invention, an iron carbonyl complexed polybutadiene prepared from Run #9 of Example 2 and a sample of the cis-1,4 polybutadiene starting material from which the complexed polybutadiene was derived were pyrolyzed under a blanket of nitrogen, that is, in an inert atmosphere. Heating of the rubbery polymer samples was conducted at a rate of 5° C. per minute and the weight of the sample was recorded with the following results:

*Table IV*

| Temperature, °C. | Percent Cis-1,4 Polybutadiene Remaining (Starting Material) | Percent of Complexed Iron Carbonyl Polybutadiene Remaining (Run #9) |
|---|---|---|
| 300 | 100 | 100 |
| 325 | 92 | 92 |
| 375 | 87 | 87 |
| 400 | 78 | 78 |
| 425 | 40 | 60 |
| 450 | 2 | 54 |
| 500 | 9 | 52 |
| 1,000 | 0 | 50 |

The above data show the superior heat stability of the complex polymers of the invention. The percent of the polybutadiene and the iron carbonyl polybutadiene at the temperatures indicated is based on the hydrocarbon portion of polymer sample. At 400° C. and below, both samples showed similar heat stability. However, at above 400° C., the conventional uncomplexed polybutadiene rapidly disintegrated, so that at from 450° to 1000° C. little, if any, of the hydrocarbon polymer remained. The metal complexed polymer possessed a considerably slower rate of degradation after 450° C. and, in fact, from 450° to 1000° C. only a small percent of the hydrocarbon portion of the polymer volatilized. Reaction with a heavy metal carbonyl and an ethylenically unsaturated polymer produces a product having surprising and unexpected heat stability upon pyrolysis. Further, the iron complexed polybutadiene sample at elevated temperatures maintained its geometric shape and had an open cell, porous structure which permitted the passage of liquids and gases. This material was a hard, black, brittle substance and possessed magnetic properties.

EXAMPLE 6

Ferromagnetic polyatomic metal polymer liquids have been prepared employing the techniques of this invention. These magnetic liquids are responsive to magnetic fields and have particular utility as magnetic clutch liquids, paints, for coating polymeric films exhibiting enhanced thermal, electrical and magnetic properties, as a catalyst for various chemical reactions such as hydrogenation and the like. Generally, a solution of the metal complexed polymer in a solvent is heated at temperatures of from 100° to 300° C. for 12 to 72 hours in an inert atmosphere in the presence of excess metal carbonyl of the same or different metal as the carbonyl used to form the complex. The resultant liquid contains a solution of the polymer and highly dispersed metal which is nonseparable under a strong magnetic field.

For example, ten grams of cis-1,4 polybutadiene were dissolved in 500 cc. of xylene and 50 cc. of dioxane. The mixture was stirred with a magnetic stirrer. Thirty cubic centimeters of iron pentacarbonyl were added to this solution which was then stirred with a magnetic stirrer; and after four hours reflux at about 135° C., another 30 cc. increment was added followed by a third increment of 30 cc. in an additional four hours. The solution was then refluxed for an additional 48 hours after the addition of the third increment. The total amount of iron pentacarbonyl added represented about 1310 wt. percent based on the weight of the monomeric butadiene content of the polybutadiene starting material and the moles of iron pentacarbonyl for each of the 30 cc. additions per mole of ethylenical unsaturation in the polybutadiene starting material was respectively and cumulatively 1.21, 2.42, and 3.63 moles of iron pentacarbonyl per mole of ethylenic unsaturation in the polymer. On cooling the solution, it was found that the black liquid was strongly attracted by and responsive to a magnetic field created by an electrical coil.

In summary, the applicants have discovered a novel metal carbonyl polymeric composition of matter and the method of preparing the same. These metal complexed polymers can be vulcanized to form excellent vulcanizates, heat treated to produce magnetic solids and liquid solutions, and possess enhanced heat resistant and stability characteristics when exposed to very high temperatures.

Although the invention has been described with some degree of particularity, it will be understood that numerous variations in details and construction are contemplated and are within the scope of the invention as claimed in the following claims.

What is claimed is:

1. A process for preparing a vulcanizable organo-metallic polymer having the general formula:

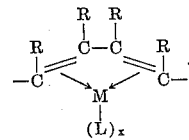

where M is a metal selected from the group consisting of iron, cobalt and nickel, R is selected from the group consisting of hydrogen and hydrocarbons, L is a carbonyl group and $x$ is a number from 1–4, which comprises reacting at a temperature of between about 30° and about 200° C. in an inert atmosphere a nonconjugated ethylenically high unsaturated hydrocarbon polymer having an average molecular weight of 1,000 to 3,000,000 with a metal carbonyl compound wherein the metal is selected from the group consisting of iron, cobalt and nickel, said metal carbonyl compound being present in the reaction in a concentration of 0.15 to 2.50 moles of metal carbonyl per mole of ethylenical unsaturation in the polymer.

2. A process according to claim 1 wherein said polymer is selected from the group consisting of a homopolymer of a $C_4$ to $C_8$ conjugated diolefin, natural rubber, a vinyl aromatic/$C_4$ to $C_8$ conjugated diolefin copolymer wherein said diene constitutes 30 to 80 wt. percent of said copolymer, a $C_4$ to $C_8$ isoolefin/$C_4$ to $C_{14}$ diolefin copolymer wherein said diolefin constitutes 50 to 98 wt. percent of said copolymer, a $C_4$ to $C_8$ conjugated diolefin/$C_2$ to $C_6$ monoalphaolefin copolymer wherein said conjugated diolefin constitutes 50 to 98 wt. percent of said copolymer, blends thereof, and graft copolymers of a vinyl-containing monomer with at least one of said group.

3. A process as defined by claim 1 wherein said metal is iron.

4. A process as defined by claim 1 wherein said reaction is carried out in a nonacid, oxygen-containing protective polar solvent for the unsaturated hydrocarbon polymer.

5. A process according to claim 1 wherein said metal carbonyl is present in a concentration of between about 0.25 to 2.50 moles of metal carbonyl per mole of ethylenical unsaturation in said polymer.

6. A process for preparing a vulcanizable iron complexed polymer composition having the general formula:

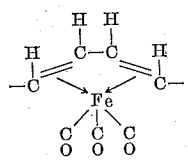

comprising reacting in a protective solvent in the presence of an inert atmosphere at a temperature of from 30° to 200° C. a nonconjugated ethylenically high unsaturated hydrocarbon polymer having an average molecular weight of 1,000 to 3,000,000 with an iron carbonyl compound, the iron carbonyl compound being present in a concentration between about 0.25 and 2.50 moles of iron carbonyl per mole of ethylenical unsaturation in the polymer, and recovering the metal carbonyl complexed polymer from the reaction mixture.

7. A process as defined by claim 6 wherein said polymer is polybutadiene having a molecular weight of from 1,000 to 3,000,000 (viscosity average).

8. A process as defined by claim 6 wherein the solvent comprises a mixture of hydrocarbon solvents and sufficient miscible nonacid oxygen-containing polar solvent to prevent undesired degradation of the molecular weight of the polymer.

9. A process as defined by claim 6 wherein the reaction is carried out at a temperature of about 70° to 200° C.

10. A process comprising heating the reaction mixture prepared as in claim 6 in an inert atmosphere above 100° C. for a period of time sufficient to form polyatomic clusters of elemental iron having magnetic properties.

11. A process for preparing a heat stable, porous, vulcanizable composition which comprises reacting in an inert atmosphere at a temperature of from 30° to 200° C. an iron carbonyl compound with a solution of a nonconjugated ethylenically high unsaturated polymer having an average molecular weight of 1,000 to 3,000,000 of a $C_4$ to $C_8$ conjugated diolefin, the iron carbonyl being present in a concentration of between about 0.25 and 2.50 moles of iron carbonyl per mole of ethylenical unsaturation in the polymer to form a metal carbonyl complexed polymer having the general formula:

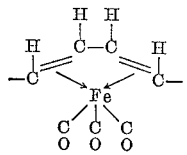

recovering said metal carbonyl complexed polymer from solution, and heating the recovered product in an inert atmosphere to a temperature of at least 100° C.

12. As a new composition of matter, a vulcanizable metal carbonyl/unsaturated polymer complex having at least one polymeric complex unit per every 30 moles of unsaturation in said polymer, said complex unit having the general formula

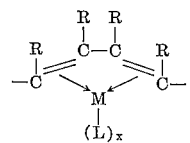

where M is a metal selected from the group consisting of iron, cobalt and nickel, R is selected from the group consisting of hydrogen and hydrocarbons, L is a carbonyl group wherein the polymer backbone has an average molecular weight of from 1,000 to 3,000,000 and $x$ is a number from 1 to 4.

13. A composition according to claim 12 wherein said unsaturated polymer is selected from the group consisting of a homopolymer of a $C_4$ to $C_8$ conjugated diolefin, natural rubber, a vinyl aromatic/$C_4$ to $C_8$ conjugated diolefin copolymer, a $C_4$ to $C_8$ isoolefin/$C_4$ to $C_{14}$ diolefin copolymer, a $C_4$ to $C_8$ conjugated diolefin/$C_2$ to $C_6$ monoalpha olefin copolymer, blends thereof, and graft copolymers of a vinyl-containing monomer with at least one of said group.

14. A composition according to claim 13 wherein said metal is iron.

15. A composition according to claim 13 where said metal is cobalt.

16. A composition according to claim 13 where said metal is nickel.

17. The vulcanizate of the composition of claim 13.

18. As a new composition of matter, a vulcanizable metal carbonyl/polybutadiene complex having at least one polymeric complex unit per every thirty moles of unsaturation in said polymer wherein the polymer backbone has an average molecular weight of from 1,000 to 3,000,000, said complex unit having the general formula

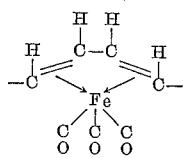

19. The vulcanizate of the composition of claim 18.

References Cited by the Examiner

UNITED STATES PATENTS 1,891,203   12/1932   Ambros et al. _____ 260—94.2
2,409,167   10/1946   Veltman _____ 260—439

JOSEPH L. SCHOFER, *Primary Examiner.*

H. I. CANTOR, C. R. REAP, *Assistant Examiners.*